United States Patent
Nuhn (10) Patent No.: US 10,212,879 B2
(45) Date of Patent: Feb. 26, 2019

(54) AUTOMATED MANURE AGITATION AND TRANSFER

(71) Applicant: Nuhn Industries Ltd., Sebringville (CA)

(72) Inventor: Ian Nuhn, Sebringville (CA)

(73) Assignee: Nuhn Industries Ltd., Sebringville (CA)

( * ) Notice: Subject to any disclaimer, the term of this patent is extended or adjusted under 35 U.S.C. 154(b) by 161 days.

(21) Appl. No.: 15/341,323

(22) Filed: Nov. 2, 2016

(65) Prior Publication Data

US 2017/0118907 A1    May 4, 2017

Related U.S. Application Data

(60) Provisional application No. 62/249,983, filed on Nov. 3, 2015.

(51) Int. Cl.
*B01F 5/02* (2006.01)
*B01F 7/00* (2006.01)
(Continued)

(52) U.S. Cl.
CPC ............ *A01C 23/047* (2013.01); *A01C 3/026* (2013.01); *B01F 5/0206* (2013.01);
(Continued)

(58) Field of Classification Search
CPC ............ B01F 15/00155; B01F 15/0243; B01F 15/026; B01F 2215/0052; B01F 2215/0054; B01F 5/0206; B01F 5/0218; B01F 2215/0003; B01F 7/00733; C02F 2103/20; C02F 3/1294; A01C 23/045;
(Continued)

(56) References Cited

U.S. PATENT DOCUMENTS

3,367,583 A * 2/1968 Kellogg ................. A01C 3/026
                                                        241/46.017
3,557,981 A    1/1971 Seymour
(Continued)

*Primary Examiner* — Tony G Soohoo
(74) *Attorney, Agent, or Firm* — Brunet & Co. Ltd.; Robert Brunet; Hans Koenig (57) ABSTRACT

A system and method that automatically transfer liquid manure from an intermediate holding receptacle to a lagoon involves a common pump for both agitating the liquid manure in and pumping the liquid manure from the receptacle. A pump motor, first valve, second valve and directable agitation nozzle of the pump are controlled by an electronic controller. The electronic controller switches on the pump motor, ensures that the first valve is closed and ensures that the second valve is open when the receptacle is full, directs the nozzle to at least two different locations in the receptacle to permit liquid manure to be redirected to the at least two different locations to agitate the liquid manure for a predetermined period of time, and opens the first valve after the predetermined period of time to permit pumping of the liquid manure from the receptacle to the lagoon. The system and method reduce equipment cost, equipment maintenance and the amount of operator time required to perform liquid manure transfer, while providing better agitation and more complete emptying of the receptacle in a shorter period of time.

19 Claims, 8 Drawing Sheets

(51) Int. Cl.
*B01F 15/00* (2006.01)
*B01F 15/02* (2006.01)
*A01C 3/02* (2006.01)
*A01C 23/04* (2006.01)
*E03F 5/22* (2006.01)
*C02F 3/12* (2006.01)
*C02F 103/20* (2006.01)

(52) U.S. Cl.
CPC ........ *B01F 5/0218* (2013.01); *B01F 7/00733* (2013.01); *B01F 7/00741* (2013.01); *B01F 15/00155* (2013.01); *B01F 15/026* (2013.01); *B01F 15/0243* (2013.01); *C02F 3/1294* (2013.01); *E03F 5/22* (2013.01); *B01F 2215/0003* (2013.01); *B01F 2215/0052* (2013.01); *B01F 2215/0054* (2013.01); *C02F 2103/20* (2013.01); *Y02W 10/15* (2015.05); *Y10S 261/75* (2013.01)

(58) Field of Classification Search
CPC ........... A01C 23/005; A01C 3/06; E03F 5/22; Y02W 10/15; Y10S 261/75
USPC .......................... 366/136, 137, 182.1–183.4
See application file for complete search history.

(56) References Cited

U.S. PATENT DOCUMENTS

| | | | | | |
|---|---|---|---|---|---|
| 3,905,725 | A | * | 9/1975 | Johnson | A01C 3/04 366/136 |
| 3,948,450 | A | * | 4/1976 | Erlitz | A01C 3/026 241/185.6 |
| 3,957,633 | A | * | 5/1976 | Gatti | C02F 3/1294 210/104 |
| 4,332,484 | A | * | 6/1982 | Peters | A01C 3/026 137/563 |
| 4,406,413 | A | * | 9/1983 | Houle | A01C 3/026 241/101.76 |
| 4,416,549 | A | * | 11/1983 | Kretschmer | A01C 3/026 366/190 |
| 4,431,597 | A | * | 2/1984 | Cramer | B01F 7/00741 261/93 |
| 4,511,257 | A | * | 4/1985 | Roberts | B01F 7/00741 366/262 |
| 4,512,665 | A | * | 4/1985 | Cline | B01F 5/02 285/282 |
| 4,515,312 | A | * | 5/1985 | Manabe | B08B 9/0933 239/227 |
| 4,555,063 | A | * | 11/1985 | Goettsch | B01F 7/00733 241/46.04 |
| 4,572,675 | A | * | 2/1986 | Roberts | B01F 7/00741 366/263 |
| 4,594,006 | A | * | 6/1986 | Depeault | B01F 5/0206 366/190 |
| 4,618,426 | A | * | 10/1986 | Mandt | B01F 7/00741 210/220 |
| 4,645,592 | A | * | 2/1987 | Calltharp | C02F 1/006 210/142 |
| 4,661,046 | A | * | 4/1987 | Ruyle | A01C 3/026 406/116 |
| 4,716,917 | A | * | 1/1988 | Schmidt | B05B 3/02 134/167 R |
| 4,724,073 | A | * | 2/1988 | Calltharp | C02F 1/006 210/142 |
| 4,775,467 | A | * | 10/1988 | Calltharp | C02F 1/006 210/142 |
| 4,830,585 | A | * | 5/1989 | Ruyle | A01C 3/026 415/66 |
| 4,877,532 | A | * | 10/1989 | Haentjens | B01F 3/04617 210/219 |
| 4,917,577 | A | * | 4/1990 | Stirling | B01F 3/04617 261/93 |
| 4,971,526 | A | * | 11/1990 | Ruyle | F04B 19/12 415/72 |
| 5,045,202 | A | * | 9/1991 | Stearns | B01F 3/0446 210/628 |
| 5,100,303 | A | * | 3/1992 | Depault | A01C 3/026 366/266 |
| 5,458,414 | A | * | 10/1995 | Crump | B01F 3/1221 366/137 |
| 5,624,241 | A | | 4/1997 | Nesseth | |
| 5,899,560 | A | * | 5/1999 | Byers | B01F 5/0218 239/263 |
| 6,276,824 | B1 | * | 8/2001 | De Jager | F04D 7/045 366/195 |
| 6,821,011 | B1 | * | 11/2004 | Crump | B01F 5/0206 366/137 |
| 8,944,758 | B2 | | 2/2015 | Nuhn | |
| 9,488,190 | B2 | | 11/2016 | Nuhn | |
| 2012/0224982 | A1 | * | 9/2012 | Nuhn | F04D 13/08 417/234 |
| 2016/0186776 | A1 | | 6/2016 | Nuhn | |
| 2017/0118907 | A1 | * | 5/2017 | Nuhn | B01F 5/0206 |

\* cited by examiner

AUTOMATED MANURE AGITATION AND TRANSFER

CROSS-REFERENCE TO RELATED APPLICATIONS

This application claims the benefit of U.S. patent application 62/249,983 filed Nov. 3, 2015, which is incorporated herein by reference.

FIELD

This application relates to systems and methods for automated manure agitation and transfer, especially using a common pump for both agitating and transferring the manure.

BACKGROUND

Large animal farming operations, for example dairy cow operations, may involve housing a large number of animals in a barn. Such operations require constant cleaning of the considerable quantities of manure produced by the animals. In a barn of this nature, solid or semi-solid manure together with solid bedding material (e.g. sand) is typically collected and dumped into an intermediate holding tank in the barn where water is added to the solids to produce liquid manure in the tank. The liquid manure and solid bedding material may be spread in a lane in the holding tank for recycling of the bedding material from the material. The liquid manure and residual bedding material may then be transferred to large reservoirs (lagoons) located outside the barn where the liquid manure is stored until transferred to liquid manure spreaders for application as fertilizer to farm fields.

Liquid manure typically comprises particles of solid manure suspended in water. Transferring the liquid manure from the intermediate holding tank to the large reservoir requires both agitating, to ensure that the solid manure and residual bedding material is adequately suspended in the water, and pumping to move the liquid manure through conduits to the large reservoir. Such transfers are typically accomplished with the use of at least two pumps, one for agitating the liquid manure and one for pumping the liquid manure. The agitating pump typically comprises a recirculating pump that simply cycles liquid through a recirculation path. Further, because the pumping operation is accomplished in a relatively short period of time, the agitating operation needs to be performed for a sufficiently long period of time prior to pumping to ensure adequate suspension of manure particles in the water. Typically, an operator will first turn on the agitating pump and then after a predetermined period of time turn on the transfer pump.

There are a number of problems with the typical method. Two pumps are required, one for agitation and one for transfer, resulting in added equipment cost and maintenance requirements. A significant amount of operator time is required to turn on the pumps at appropriate times, resulting in less operator time available for other activities required in a busy large animal farming operation. And, inadequate agitation from the recirculating pump either prevents complete emptying of the intermediate holding tank or necessitates longer agitation time to ensure complete emptying.

SUMMARY

In one aspect, there is provided a system for automatically transferring liquid manure from an intermediate holding receptacle to a lagoon, comprising a pump at least partially immersable in the liquid manure in the receptacle, the pump comprising a pump motor configured to move the liquid manure from the receptacle into the pump, a first valve configured to control liquid flow out of the pump into the lagoon and a second valve configured to control liquid flow out of the pump through a directable agitation nozzle into the receptacle, the pump in electronic communication with an electronic controller configured to control the pump motor, first valve, second valve and directable nozzle, the electronic controller comprising pre-programmed instructions to: switch on the pump motor, ensure that the first valve is closed and ensure that the second valve is open in response to the electronic controller receiving a signal from a full receptacle sensor indicating that the liquid manure in the receptacle is at or exceeds a high level mark; direct the nozzle to at least two different locations in the receptacle to permit liquid manure pumped from the receptacle by the pump to be redirected to the at least two different locations in the receptacle to agitate the liquid manure in the receptacle for a predetermined period of time; and, open the first valve after the predetermined period of time to permit the pump to pump the liquid manure from the receptacle out to the lagoon.

In another aspect, there is provided a method of automatically transferring liquid manure from an intermediate holding receptacle to a lagoon, comprising: immersing a pump at least partially in the liquid manure in the receptacle, the pump comprising a pump motor configured to move the liquid manure from the receptacle into the pump, a first valve configured to control liquid flow out of the pump into the lagoon and a second valve configured to control liquid flow out of the pump through a directable agitation nozzle into the receptacle; and, configuring an electronic controller in electronic communication with the pump with pre-programmed instructions to control the pump motor, first valve, second valve and directable nozzle, wherein the electronic controller: switches on the pump motor, ensures that the first valve is closed and ensures that the second valve is open in response to the electronic controller receiving a signal from a full receptacle sensor indicating that the liquid manure in the receptacle is at or exceeds a high level mark; directs the nozzle to at least two different locations in the receptacle to permit liquid manure pumped from the receptacle by the pump to be redirected to the at least two different locations in the receptacle to agitate the liquid manure in the receptacle for a predetermined period of time; and, opens the first valve after the predetermined period of time to permit the pump to pump the liquid manure from the receptacle out to the lagoon.

In comparison to the prior art, the system and method reduce capital costs, reduce maintenance requirements and reduce the amount of operator time required to perform liquid manure transfer, while providing more thorough agitation of liquid manure in the receptacle and more complete emptying of the receptacle in a shorter period of time.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

In the present invention, a single pump may be used for both agitation of the liquid manure in the receptacle and transfer of the liquid manure from the receptacle to the lagoon. Suitable pumps comprise a pump motor configured to move the liquid manure from the receptacle into the pump, a first valve configured to control liquid flow out of the pump into the lagoon and a second valve configured to control liquid flow out of the pump through a directable agitation nozzle into the receptacle. Some examples of pumps include positive displacement pumps, impulse pumps, velocity pumps, gravity pumps and valveless pumps. Velocity pumps are particularly preferred, for example radial flow pumps, involving an impeller drivingly connected to the pump motor by a shaft. The pump motor may be electric or hydraulic or powered in any other suitable fashion. The pump may further comprise various conduits for transporting liquid manure in the pump. Conduits may include, for example, one or more inlets, one or more outlets, one or more intermediate conduits connecting the one or more inlets to the one or more outlets and one or more nozzle conduits for providing flow of liquid to the agitation nozzle. Further, the pump may comprise one or more combiners to merge flows from two or more conduits into a single conduit. Furthermore, the pump may comprise one or more support and/or mounting structures for supporting and/or mounting the pump on the receptacle. While not restricted to any particular pump, one suitable style of pump is described in U.S. Pat. No. 8,944,758 issued Feb. 3, 2015, the entire contents of which is herein incorporated by reference.

The pump comprises a directable agitation nozzle that is configured to eject liquid manure back into the receptacle. Ejecting liquid manure back into the receptacle agitates the contents of the receptacle, which serves to mix settled material such as bedding material and solid manure particles in the liquid. Adequate mixing of solid materials leads to more complete emptying of the receptacle by the pump. The agitator nozzle is directable so that an outlet of the nozzle points to at least two different locations in the receptacle to permit liquid manure pumped from the receptacle by the pump to be redirected to the at least two different locations in the receptacle. Preferably, the at least two different locations is at least four different locations. More preferably, the agitator nozzle is orientable through a plurality of angles in one or more planes, for example a horizontal plane and/or a vertical plane with respect to a floor of the receptacle, so that the nozzle is directable to a plurality of different locations in the receptacle defined by angles formed between a longitudinal axis of the nozzle and the horizontal plane and/or vertical plane. Any suitable mechanism or mechanisms may be employed to orient the nozzle, for example a combination of one or more motors (e.g. electric or hydraulic motors), one or more actuators (e.g. hydraulic cylinders, electric actuators) and/or one or more gears, which move the nozzle into a desired orientation. Preferably, the agitator nozzle is at least directable to one or more of the corners of the receptacle for improved agitation of liquid manure in the receptacle.

The pump comprises a first valve configured to control liquid flow out of the pump into the lagoon and a second valve configured to control liquid flow out of the pump through the directable agitation nozzle into the receptacle. Any suitable valves useable for controlling liquid flow in conduits may be utilized, for example knife gate valves, butterfly valves, pinch valves, piston valves and the like. The first and second valves may be electronically controllable. The valves preferably permit intermediate regulation of liquid flow in addition to on/off regulation of the liquid flow.

When emptying the receptacle, it is desirable to undertake at least some agitation of the liquid manure in the receptacle before starting to pump the liquid manure out of the receptacle in order to provide maximum liquid content for agitation. Therefore, at the outset of the operation, ensuring that the first valve is closed and the second valve is open before, at the same time or shortly after the pump motor is switched on will ensure that the liquid manure is only pumped through the agitator nozzle when the pump motor is switched on. The first valve may remain closed and the second valve may remain open for a predetermined period of time while the agitation nozzle is directed to different locations in the receptacle to ensure adequate agitation of the liquid manure before starting to pump the liquid manure out of the receptacle. The predetermined period of time is generally known in the art and depends to some extent on the nature of the manure and bedding material in the receptacle and the size of the receptacle.

After the predetermined period of time, the first valve may be opened to permit the pump to pump the liquid manure from the receptacle out to the lagoon. The second valve may remain open or may be partially or fully closed when or after the first valve is opened. In one embodiment, the second valve may be completely closed when a set period of time has passed after the first valve is opened. Closing the second valve when the first valve is open provides maximum pressure for pumping the liquid manure out to the lagoon, thereby reducing the amount of time required to completely empty the receptacle. However, it may be desirable to continue agitation of the liquid manure in the receptacle while the liquid manure is being pumped out to the lagoon. In one embodiment when continued agitation is desired, the second valve may remain open or be only partially closed while the liquid manure is being pumped out through the first valve. The first and second valves may be proportionately controlled to balance the rate of emptying with the amount of agitation to ensure complete emptying in the shortest period of time. The set period of time for a particular operation is generally when sufficient agitation has been achieved to ensure complete emptying, which is dependent to some extent on the nature of the manure and bedding material in the receptacle and the size of the receptacle. The set period of time for a given farming operation may be readily determined by simple experimentation.

In another embodiment, continued agitation may be accomplished by alternating opening and closing of the first and second valves. For example, there may be a series of predetermined times in which the first valve is completely closed and the second valve is completely open interspersed with a series of set times in which the first valve is completely open and the second valve is completely closed. Thus, a period of agitation would be followed by a period of receptacle emptying, followed by another period of agitation, followed by another period of receptacle emptying, where the cycle is repeated until the receptacle has been completely emptied. The predetermined times in the series may be the same or different, and the set times in the series may be the same or different. The various individual times may be programmed for desired performance and are dependent to some extent on the nature of the manure and bedding material in the receptacle and the size of the receptacle. Optimal times predetermined and set times for a given farming operation may be readily determined by simple experimentation.

After the receptacle is emptied, the pump motor may be switched off. The first valve may be closed at this time or remain open until the pump is switched back on, at which time the first valve may be closed. The second valve may be opened when the pump motor is switched off or remain closed until the pump is switched back on. The pump may be switched on with both the first and second valve closed, in which case the liquid manure in the receptacle is neither agitated nor pumped out to the lagoon.

To automate the system and method, use may be made of an electronic controller in electronic communication with the pump and any sensors in the system. The electronic controller is preferably programmable. Programmable electronic controllers are generally known in the art, for example a programmable logic circuit (PLC). A PLC may comprise a microprocessor with a central processing unit, random access memory (RAM), read only memory (ROM), long-term memory capacity, an input device, an output device and other components of such circuits. The electronic controller may be pre-programmed with instructions in the form of computer code to operate the pump motor, agitator nozzle, first valve and second valve, and to receive and act on signals from one or more sensors. The pre-programmed instructions may be alterable by a trained technician and/or an operator, especially to change various operating parameters of the pump, for example, the predetermined period of time, the set period of time, the locations to which the nozzle is directed, and the like. The system may further comprise means for transmitting data between the electronic controller and a remote computer. For example, the electronic controller may be interfaced with a wireless or hard-wired network of computers. Wireless networks, for example the world wide web or internet, are preferred, and the electronic controller may be connected through the network to any suitable kind of remote computer, for example a desk top computer, a portable computer, a personal data device (PDA) or a cell phone. An operator and/or trained technician would then be able to alter the pre-programmed instructions from a remote location.

One or more sensors may be employed to determine liquid manure level in the receptacle. The one or more sensors may be used to determine when the receptacle is full and/or empty. Thus, the one or more sensors may comprise at least a full receptacle sensor and an empty receptacle sensor. The full receptacle sensor and empty receptacle sensor may comprise the same sensor capable of accomplishing both determinations. Suitable liquid level sensors are generally known in the art. Examples of the one or more sensors may include contact and non-contact liquid level sensors. An example of a contact liquid level sensor is a float ball. However, non-contact liquid level sensors are preferred, for example sonar-based sensors and ultrasound-based sensors.

When the liquid manure level is at or exceeds a high level mark, the one or more sensors may transmit a signal to the electronic controller prompting the electronic controller to automatically start emptying the receptacle. Thus, the electronic controller would start the pump motor and ensure that the first valve is closed and the second valve is open to begin agitation in accordance with the pre-programmed instructions, and then automatically follow through on the remainder of the method as described above to empty the receptacle and transfer the liquid manure to the lagoon. When the liquid manure level is at or below a low level mark, the one or more sensors may transmit a signal to the electronic controller prompting the electronic controller to automatically switch off the pump motor, and return the system to a ready state. Alternatively or in addition to a sensor for determining whether liquid manure level is below a low level mark, the empty receptacle sensor may determine whether no more liquid manure is entering or exiting the pump, which may be an indication that the receptacle is empty.

Intermediate holding receptacles are generally known in the art and typically comprise tanks, pits or basins, usually made of concrete, located in an animal housing facility (e.g. a barn). The intermediate holding receptacle may be of any shape, for example rectangular, square, oval, circular or irregularly shaped, although rectangular intermediate holding receptacles are common. Solid or semi-solid manure together with solid bedding material (e.g. sand) is collected and dumped into the intermediate holding receptacle and water is added to the solids to produce the liquid manure. Intermediate holding receptacles are employed for any of a number of reasons including providing the opportunity to recycle bedding material (e.g. sand) and providing a convenient location close to the source of manure where the manure from throughout the animal housing facility may be collected.

The liquid manure in the intermediate holding receptacle is transferred to a lagoon located outside the animal housing facility where the liquid manure is stored before being transferred to manure spreaders for application as fertilizer to fields or for other uses. The lagoon may comprise a tank (e.g. large steel or concrete tanks) or open pits in the ground.

Figure 1A:
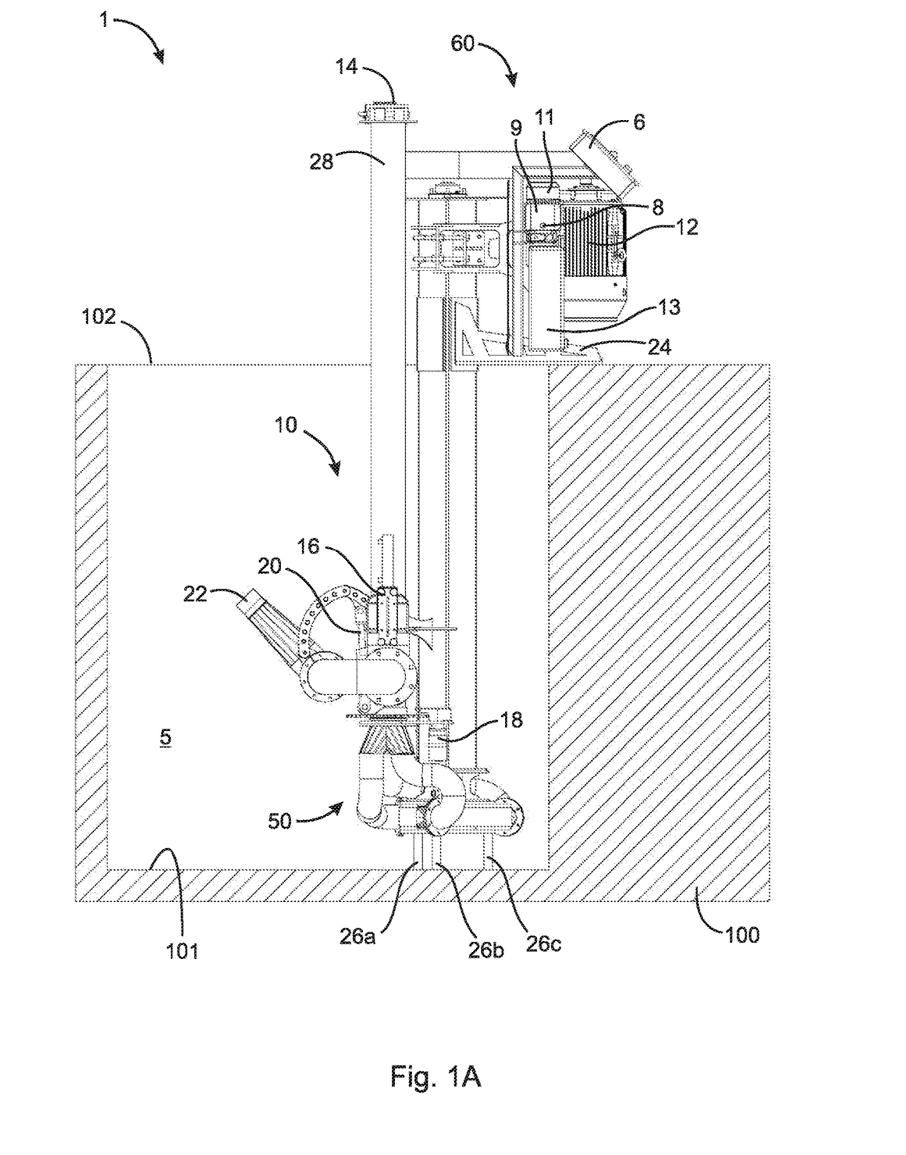
FIG. 1A depicts a system for automated liquid manure agitation in and transfer from an intermediate holding receptacle to a lagoon.
Figure 1B:
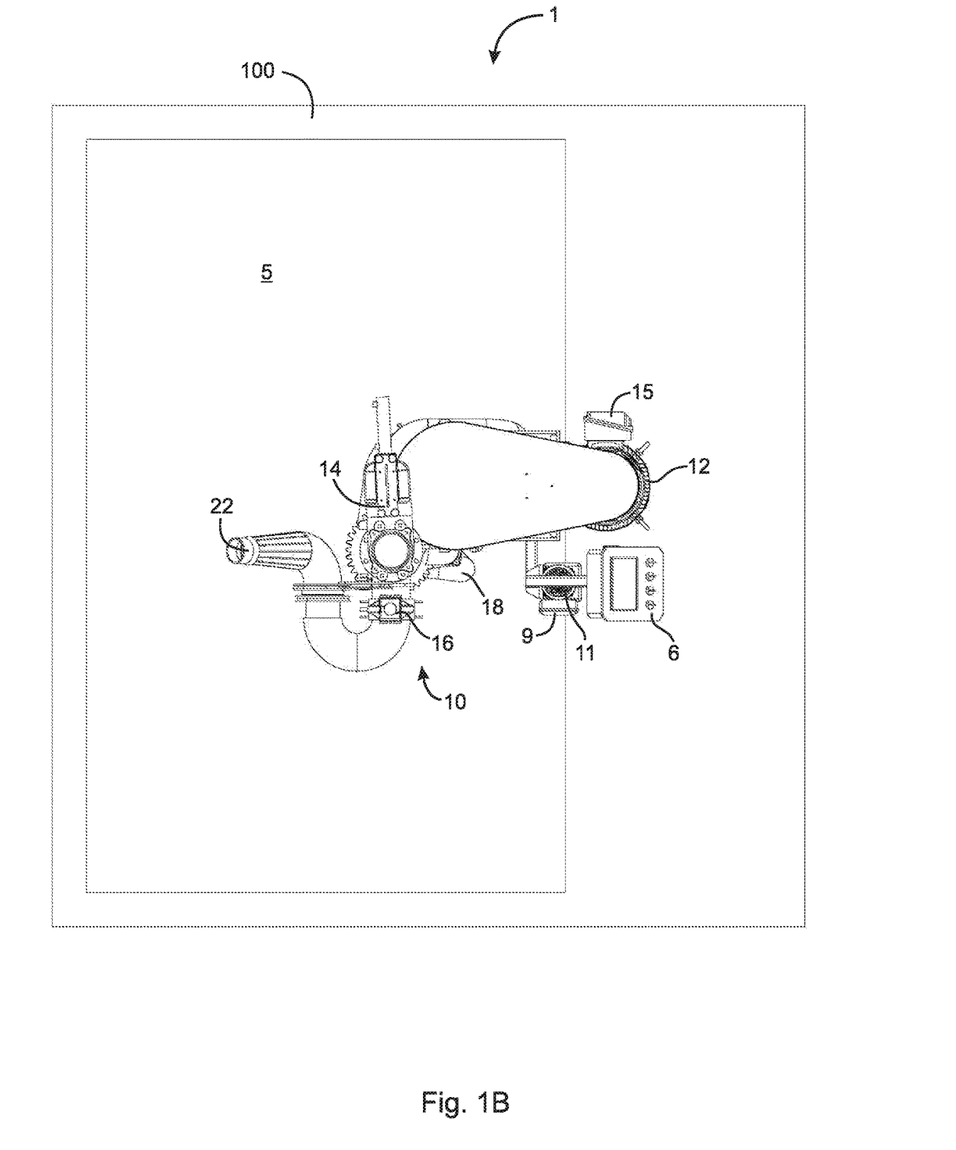
FIG. 1B depicts a top view of FIG. 1A.

FIG. 1A and FIG. 1B illustrate one embodiment of a system 1 for automated agitation of liquid manure 5 in a rectangular intermediate holding receptacle 100 and transfer of the liquid manure 5 from the receptacle 100 to a lagoon (not shown). The system 1 comprises a pump 10 having a programmable logic controller (PLC) 6 and an ultrasonic liquid level sensor 8, the liquid level sensor 8 located in an electrical box 9, the electrical box 9 used to control a hydraulic power pack 11 for the agitation function. The ultrasonic liquid level sensor could be alternatively located in a main electrical box 15 on the side of the pump 10, or an additional ultrasonic liquid level sensor could be located in the main electrical box 15. The PLC 6 is in electronic communication with the liquid level sensor 8 and various controllable elements of the pump 10 including an electric pump motor 12 and the hydraulic power pack 11, the hydraulic power pack 11 controlling an outlet valve assembly 14, a nozzle valve assembly 16, a hydraulic nozzle positioning motor 18 configured to move an agitator nozzle 22 in a horizontal plane with respect to a floor 101 of the receptacle 100, and a hydraulic cylinder 20 configured to move the agitator nozzle 22 in a vertical plane with respect to the floor 101. The pump 10 may be an electric over hydraulic system in which valves and other movable elements of the pump are operated hydraulically by hydraulic fluid from a hydraulic fluid reservoir 13 of the hydraulic power pack 11, the hydraulic fluid being made available under the control of electric solenoids that are activated from the electrical box 9 in accordance with instructions from the PLC 6. The pump 10 is supported on and secured to the receptacle 100 through a pump support bracket 24. The pump 10 is also supported in the receptacle 100 by feet 26a, 26b, 26c resting on the floor 101 of the receptacle 100. A bottom end 50 of the pump 10 is immersable in the liquid manure 5, while a top end 60 of the pump 10 remains above a top 102 of the receptacle 100 out of the liquid manure 5.

Figure 2:
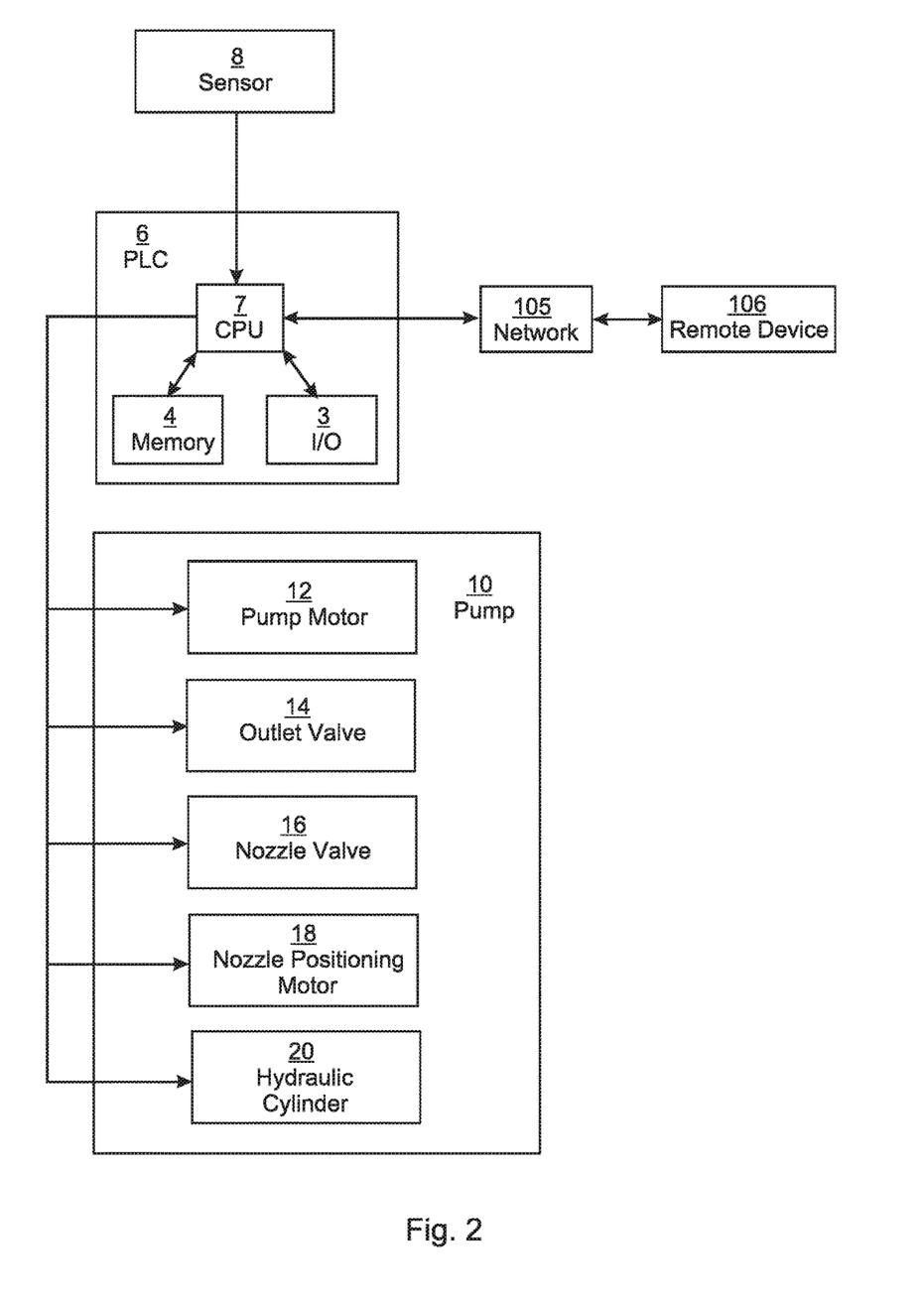
FIG. 2 depicts a block diagram illustrating automated electronic control of a system of the present invention.

FIG. 2 depicts a block diagram illustrating automated electronic control of the system 1. With reference to FIG. 1A, FIG. 1B and FIG. 2, when the liquid level sensor 8 detects that the liquid manure 5 has reached a high level mark, for example the top 102 of the receptacle 100, the liquid level sensor 8 electronically transmits a signal to a central processing unit (PCU) 7 of the PLC 6 indicating that the high level mark has been reached. In response to the signal from the sensor 8 that the receptacle 100 is full, and in accordance with instruction encoded in memory 4 of the PLC 6, the CPU 7 of the PLC 6 transmits an electronic signal to the pump motor 12 to switch on, an electronic signal to an outlet valve, for example a knife gate valve, in the outlet valve assembly 14 to close and an electronic signal to a nozzle valve, for example a knife gate valve, in the nozzle valve assembly 16 to open. The CPU 7 of the PLC 6 also transmits electronic signals to the nozzle positioning motor 18 and hydraulic cylinder 20 to orient the agitator nozzle 22 toward a first bottom corner of the receptacle 100 in accordance with pre-programmed instructions in the memory 4 of the PLC 6.

With the pump motor 12 switched on, the outlet valve closed and the nozzle valve open, the liquid manure 5 is pumped into the pump 10 at the bottom end 50 and pumped out of the pump 10 through the agitator nozzle 22 to begin a preliminary agitation period. The pump 10 and its operation are more fully described in connection with FIG. 4, FIG. 5, FIG. 6, FIG. 7A and FIG. 7B below. Liquid manure ejected out through the agitator nozzle 22 into the first bottom corner of the receptacle 100 stirs up solid material in and around the first corner thereby suspending the solid material in the liquid manure 5 in the receptacle 100. The agitator nozzle 22 remains oriented toward the first bottom corner for a first period of time, at the end of which the PLC 6 based on pre-programmed instructions in the memory 4 will transmit a signal from the CPU 7 to the nozzle positioning motor 18 and the hydraulic cylinder 20 to move the agitator nozzle 22 into a position oriented toward a second corner of the receptacle 100. Liquid manure ejected out through the agitator nozzle 22 into the second bottom corner of the receptacle 100 stirs up more solid material in and around the second corner thereby suspending the solid material in the liquid manure 5 in the receptacle 100. The process is repeated for third and fourth bottom corners of the receptacle 100, whereupon an end to the preliminary agitation period is achieved.

At the end of the preliminary agitation period, the PLC 6 sends a signal to the outlet valve to open whereupon liquid manure in the pump 10 may be pumped out of an outlet pipe 28 to the lagoon (not shown). The pre-programmed instructions may also prompt the PLC 6 to signal the nozzle valve to close, in which case the pump 10 is solely focused on pumping the liquid manure 5 to the lagoon, which results in the most rapid emptying of the receptacle 100. However, depending on past experiences, the nature of the solid material, the length of the preliminary agitation period and the size of the receptacle 100, the pre-programmed instructions may prompt the PLC 6 not to send a signal to close the nozzle valve or to send a signal to only partially close the nozzle valve so that some agitation of the liquid manure 5 may continue. Any desired sequence and timing of agitation may be pre-programmed into the PLC 6 before and during pumping of the liquid manure 5 into the lagoon.

The PLC 6 may also comprise input and output (I/O) devices 3 so that an operator can change the pre-programmed instructions based on various operational parameters to improve efficiency of emptying. Input and output devices are generally known, Input devices may include, for example, buttons, touch pads or screens, microphones, keyboards and the like. Output devices may include, for example, LCD or LED screens, speakers, and the like. Further, the PLC 6 may be interfaced with a network 105 (e.g. the internet) to which a remote device 106 (e.g. a desk top computer, a portable computer, a personal data device (PDA), a cell phone or the like) is also interfaced so that data may be transmitted between the PLC 6 and a remote device 106. In this way, an operator can both monitor the system 1 and make changes to the pre-programmed instructions without being on-site.

Figure 3:
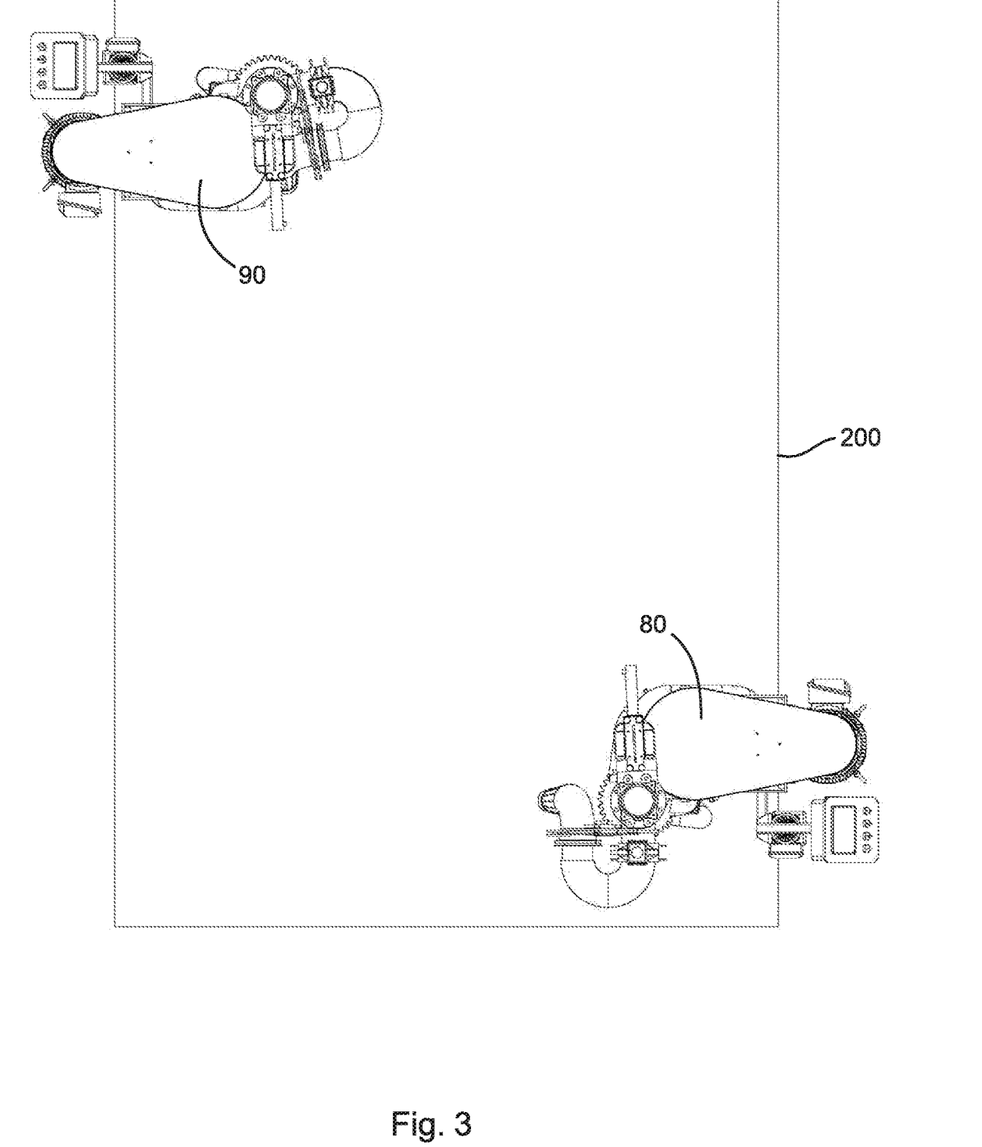
FIG. 3 depicts a top view of a large intermediate holding receptacle with two pumps, both pumps configured for both automated liquid manure agitation and automated liquid manure transfer.

FIG. 3 depicts a top view of a large intermediate holding receptacle 200 with two pumps 80, 90 mounted therein. Both pumps 80, 90 are configured for both automated liquid manure agitation and automated liquid manure transfer in a similar manner as the pump 10 as described above. A system with two or more such pumps is useful for very large receptacles in which one pump cannot adequately agitate the entire volume of the receptacle and/or cannot empty the receptacle at an adequate rate.

FIG. 4, FIG. 5, FIG. 6, FIG. 7A and FIG. 7B illustrate the pump 10 used in the system 1 to perform the method of automatically transferring the liquid manure 5 from the receptacle 100 to the lagoon. As mentioned above, the pump 10 comprises the bottom end 50 immersable in the liquid manure and the top end 60 that remains above the liquid manure. The top end 60 comprises mounting elements to facilitate mounting the PLC 6 and liquid level sensor 8 on the pump 10. The top end 60 also comprises the pump support bracket 24 configured to support and secure the pump on the receptacle. The top end 60 also comprises the electric pump motor 12, which rotationally drives a vertical drive shaft 30 by means of a belt (not shown) in belt housing 32. The vertical drive shaft 30 extends between the top end 60 and the bottom end 50 of the pump 10 and is housed in a drive shaft housing 31. A vaned centripetal impeller (not shown) is fixedly mounted at a bottom end of the drive shaft 30 and housed in impeller housing 34. The pump housing 34 comprises three downwardly extending feet 26a, 26b, 26c to support the pump 10 on the floor of the receptacle. The pump housing 34 also comprises three radially oriented exits ports from which three upwardly and outwardly extending impeller housing conduits 35, 36, 37 extend. The three impeller housing conduits 35, 36, 37 meet at a combiner 38 where liquid manure flow from the three impeller housing conduits 35, 36, 37 are combined into a single liquid flow that flows into a hollow cylindrical nozzle body 42 above the combiner 38. The nozzle body 42 is also connected to and in fluid communication with the outlet pipe 28. Outlet valve assembly 14 at a top end of the outlet pipe 28 comprises an electronically controllable outlet valve for controlling liquid manure flow from the outlet pipe 28 to a transfer pipe (not shown) to the lagoon. The outlet pipe 28 may be stabilized on the pump 10 by support flanges 33, 39 connecting the outlet pipe 28 to the drive shaft housing 31.

A nozzle assembly 40 connected to the outlet pipe 28 comprises the agitator nozzle 22 in fluid communication with the nozzle body 42 above the combiner 38 by way of a nozzle conduit 41. The nozzle assembly 40 further comprises the nozzle valve assembly 16. The nozzle valve assembly 16 between the nozzle conduit 41 and the nozzle body 42 comprises an electronically controllable nozzle valve for controlling liquid manure flow from the nozzle body 42 to the agitator nozzle 22.

Figure 7A:
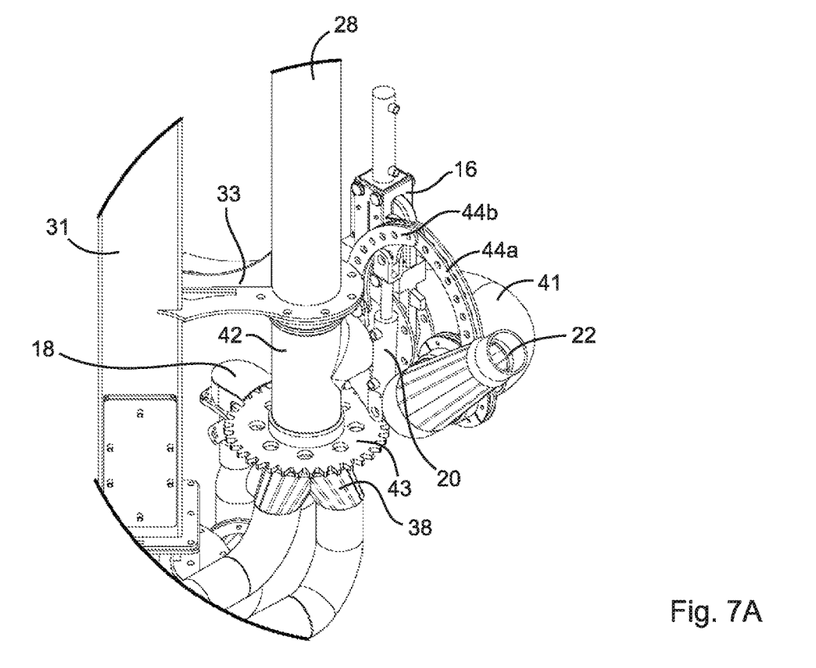
FIG. 7A depicts a magnified view of an agitation nozzle of the pump shown in FIG. 4 in association with other pump structures.
Figure 7B:
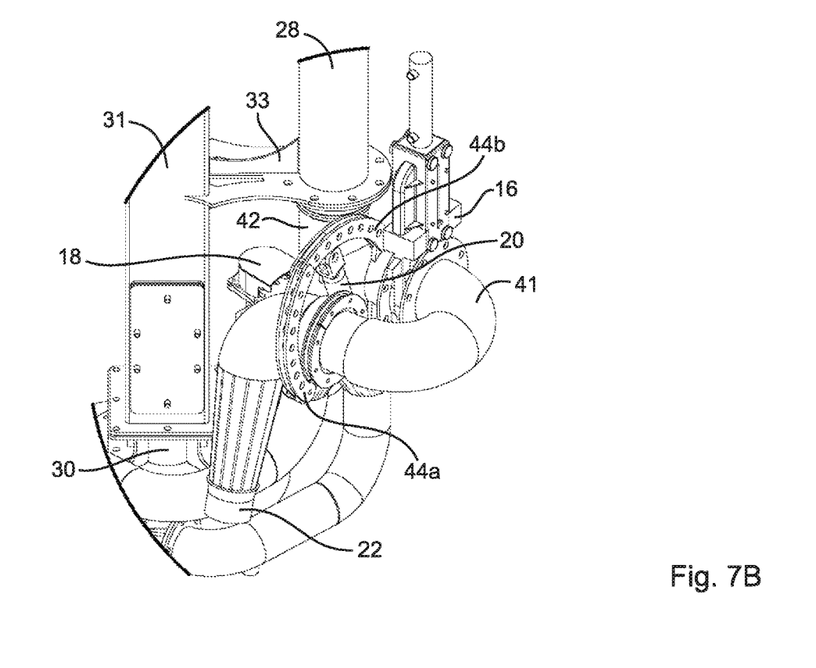
FIG. 7B depicts the agitation nozzle of the pump shown in FIG. 7A oriented differently.

With reference especially to FIG. 7A and FIG. 7B, the nozzle assembly 40 further comprises two nozzle orientation elements, one for controlling nozzle orientation in the horizontal plane and one for controlling nozzle orientation in the vertical plane. To control nozzle orientation in the horizontal plane, the nozzle body 42 and therefore the agitator nozzle 22 are rotatable about a vertical axis of the nozzle body 42. The nozzle body 42 includes sealing means, such as O-rings, to prevent liquid leakage at the sites of rotation between the nozzle body 42 and the combiner 38 and between the nozzle body 42 and the outlet pipe 28. The nozzle body 42 comprises a nozzle sun gear 43, which is engaged by a nozzle moon gear (not shown) that is driven by the nozzle positioning motor 18. Activation of the nozzle positioning motor 18 in a clockwise or counter-clockwise direction causes an opposite rotation of the sun gear 43 and the nozzle body 42.

To control nozzle orientation in the vertical plane, a pair of arcuate linkages 44a, 44b may connect the nozzle 22 to the nozzle body 42. The arcuate linkages 44a, 44b are pivotally connected to each other at one of a series of connecting aperture on each of the linkages 44a, 44b. The linkage 44a is connected to the agitator nozzle 22 and the linkage 44b is connected to the nozzle body 42. The arcuate linkage 44b may be actuated by the hydraulic cylinder 20, the hydraulic cylinder 20 pivotally connected to linkage 44b and pivotally connected to the nozzle body 42. Further, each arcuate linkage pivots at the pivot point connecting the linkages 44a, 44b, which causes the agitator nozzle 22 to move and change angular orientation relative to the pump 10 in the vertical plane. Extension and retraction of the hydraulic cylinder 20 cause the agitator nozzle 22 to move in opposite directions. Pivotally connecting the arcuate linkages 44a, 44b at different connecting apertures can adjust the extent to which the agitator nozzle 22 may move in the vertical plane, i.e. adjusts the maximum and minimum angular orientation of the agitator nozzle 22. By adjustment of both the rotation of the nozzle body 42 and the angular orientation of the agitator nozzle 22, almost any desired orientation of the agitator nozzle 22 may be created relative to the pump 10. FIG. 7A and FIG. 7B illustrate that the agitator nozzle 22 may assume a wide range of orientations.

Figure 4:
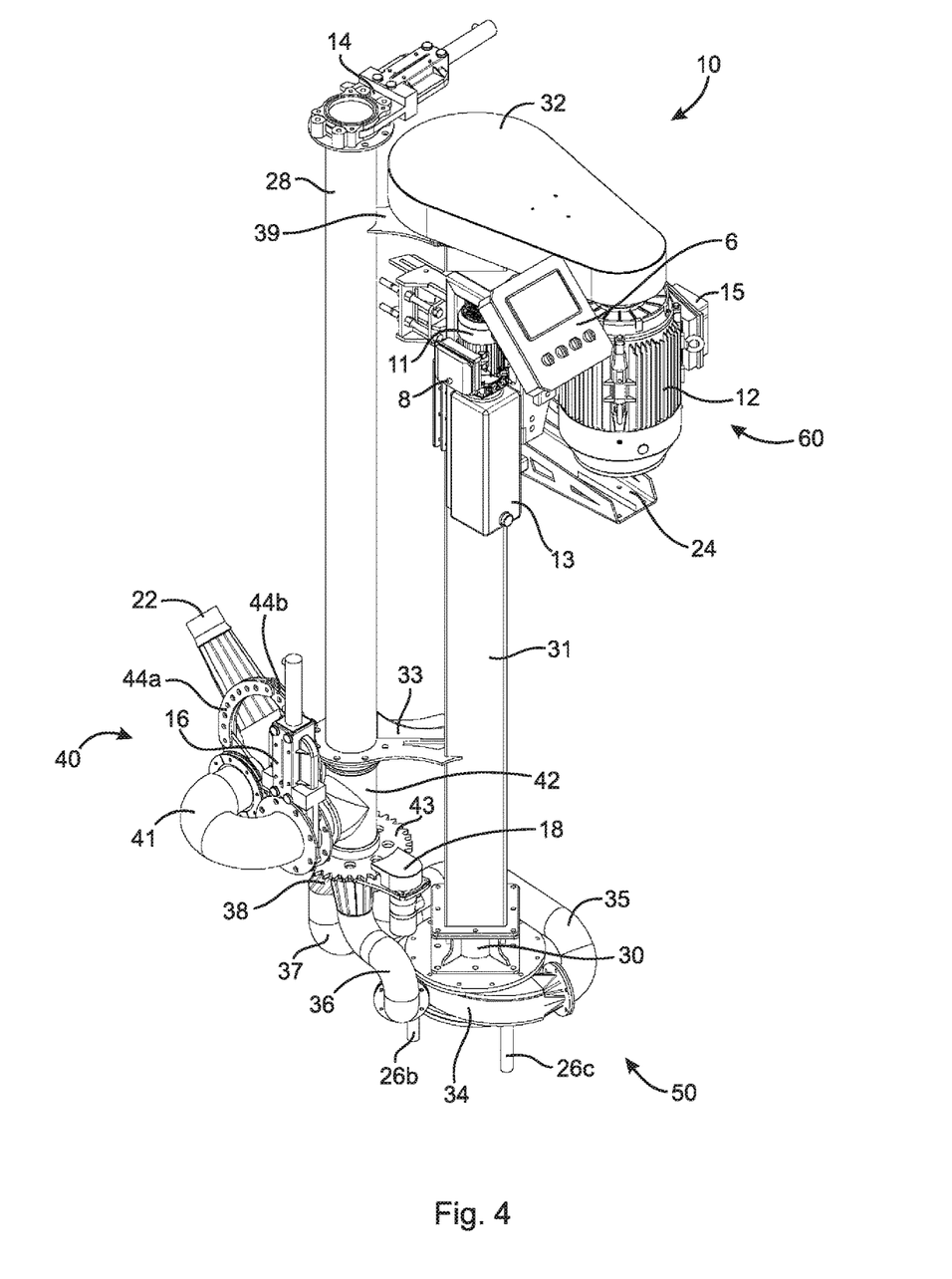
FIG. 4 depicts a perspective view of a pump useful in the system shown in FIG. 1A.
Figure 5:
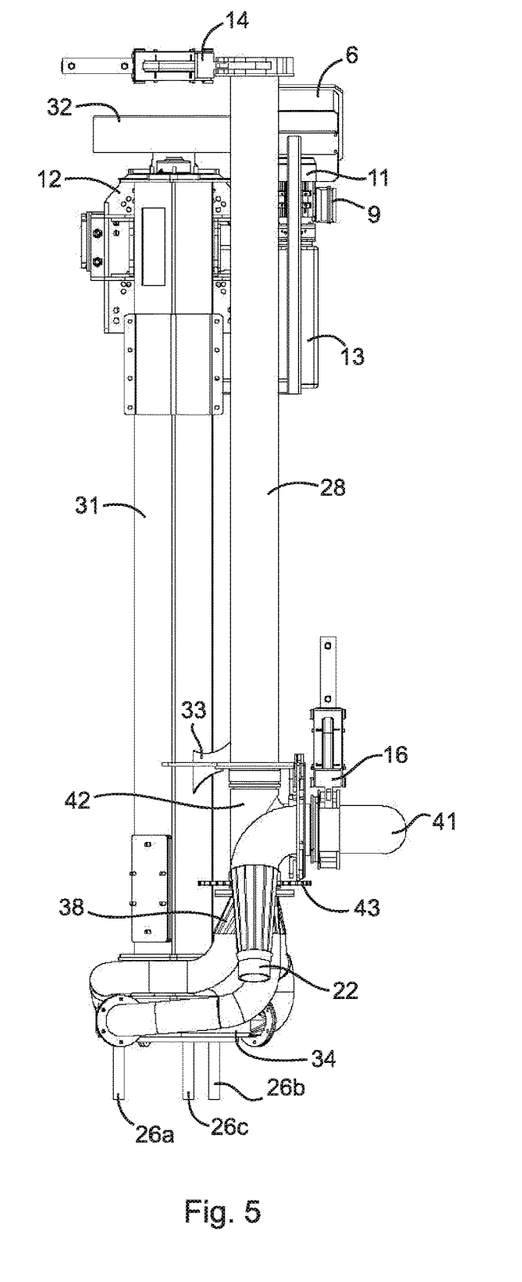
FIG. 5 depicts a rear view of the pump shown in FIG. 4 with an agitation nozzle oriented differently.
Figure 6:
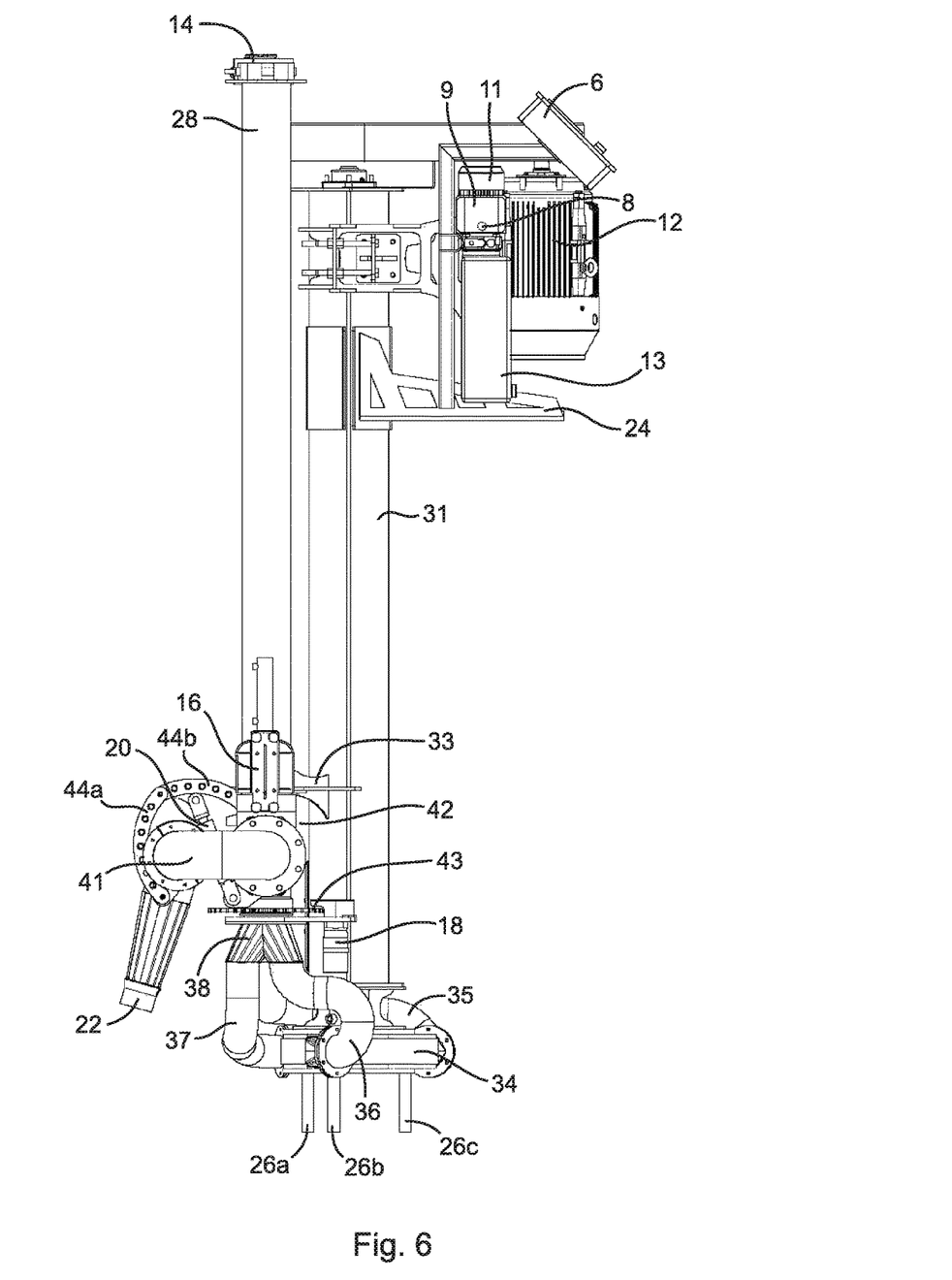
FIG. 6 depicts a side view of the pump shown in FIG. 5.

In operation, as the impeller is rotated by the drive shaft 30 about the vertical axis of the drive shaft 30, the impeller draws liquid manure up into the impeller housing 34 through an inlet in the impeller housing 34. The impeller causes the liquid manure to flow tangentially and radially into the impeller housing conduits 35, 36, 37, which carry the liquid manure to the combiner 38 where the three flows are combined into one flow that passes into the nozzle body 42. From the nozzle body 42, the liquid manure may either flow into the nozzle conduit 41 or the outlet pipe 28. If the outlet valve in the outlet valve assembly 14 and the nozzle valve in the nozzle valve assembly 16 are both closed, the liquid manure fills the outlet pipe 28 but has nowhere else to go except back out the inlet in the impeller housing 34. If the outlet valve in the outlet valve assembly 14 is closed and the nozzle valve in the nozzle valve assembly 16 is open, the liquid manure is ejected out the agitator nozzle 22 to agitate the liquid manure in the receptacle. If the outlet valve in the outlet valve assembly 14 is open and the nozzle valve in the nozzle valve assembly 16 is closed, the liquid manure flows out the outlet pipe 28 to the lagoon. If the outlet valve in the outlet valve assembly 14 and the nozzle valve in the nozzle valve assembly 16 are both open, the liquid manure is ejected out the agitator nozzle 22 and also flows out the outlet pipe 28 to the lagoon, but at lesser pressure than when one of the valves is closed.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A system for automatically transferring liquid manure from an intermediate holding receptacle to a lagoon, comprising
   a pump at least partially immersible in the liquid manure in an intermediate holding receptacle, the receptacle having a full receptacle sensor, the pump comprising a directable agitation nozzle, a pump motor configured to move the liquid manure from the receptacle into the pump, a first valve configured to control liquid flow out of the pump into the lagoon and a second valve configured to control liquid flow out of the pump through the directable agitation nozzle into the receptacle,
   the pump in electronic communication with an electronic controller configured to control the pump motor, first valve, second valve and directable nozzle, the electronic controller comprising pre-programmed instructions to:
   switch on the pump motor, ensure that the first valve is closed and ensure that the second valve is open in response to the electronic controller receiving a signal from the full receptacle sensor indicating that the liquid manure in the receptacle is at or exceeds a high level mark;
   direct the nozzle to at least two different locations in the receptacle to permit liquid manure pumped from the receptacle by the pump to be redirected to the at least two different locations in the receptacle to agitate the liquid manure in the receptacle for a predetermined period of time; and,
   open the first valve after the predetermined period of time to permit the pump to pump the liquid manure from the receptacle out to the lagoon.

2. The system according to claim 1, wherein the electronic controller is pre-programmed to close or partially close the second valve when or after the first valve is opened.

3. The system according to claim 2, wherein the electronic controller is pre-programmed to close the second valve completely when a set period of time has passed after the first valve is opened.

4. The system according to claim 1, wherein the at least two different locations is at least four different locations.

5. The system according to claim 1, wherein the electronic controller is pre-programmed to switch off the pump motor when the receptacle is empty.

6. The system according to claim 1, further comprising an empty receptacle sensor in electronic communication with the electronic controller, the electronic controller switching off the pump motor in response to a signal from the empty receptacle sensor, the signal indicating that the liquid manure in the receptacle is at or lower than a low level mark or indicating that no more liquid manure is entering or exiting the pump.

7. The system according to claim 6, wherein the full receptacle sensor and the empty receptacle sensor comprise the same sensor.

8. The system according to claim 1, wherein the pre-programmed instructions are alterable.

9. The system according to claim 1, further comprising means for transmitting data between the electronic controller and a remote computer.

10. The system according to claim 1, wherein the electronic controller comprises a programmable logic circuit (PLC).

11. A method of automatically transferring liquid manure from an intermediate holding receptacle to a lagoon, comprising:
  immersing a pump at least partially in the liquid manure in an intermediate holding receptacle, the receptacle having a full receptacle sensor, the pump comprising a directable agitation nozzle, a pump motor configured to move the liquid manure from the receptacle into the pump, a first valve configured to control liquid flow out of the pump into the lagoon and a second valve configured to control liquid flow out of the pump through the directable agitation nozzle into the receptacle; and,
  configuring an electronic controller in electronic communication with the pump with pre-programmed instructions to control the pump motor, first valve, second valve and directable nozzle,
wherein the electronic controller:
  switches on the pump motor, ensures that the first valve is closed and ensures that the second valve is open in response to the electronic controller receiving a signal from the full receptacle sensor indicating that the liquid manure in the receptacle is at or exceeds a high level mark;
  directs the nozzle to at least two different locations in the receptacle to permit liquid manure pumped from the receptacle by the pump to be redirected to the at least two different locations in the receptacle to agitate the liquid manure in the receptacle for a predetermined period of time; and,
  opens the first valve after the predetermined period of time to permit the pump to pump the liquid manure from the receptacle out to the lagoon.

12. The method according to claim 11, wherein the electronic controller closes or partially closes the second valve when or after the first valve is opened.

13. The method according to claim 12, wherein the electronic controller closes the second valve completely when a set period of time has passed after the first valve is opened.

14. The method according to claim 11, wherein the at least two different locations is at least four different locations.

15. The method according to claim 11, wherein the electronic controller switches off the pump motor when the receptacle is empty.

16. The method according to claim 11, wherein the electronic controller switches off the pump motor in response to a signal from an empty receptacle sensor, the signal indicating that the liquid manure in the receptacle is at or lower than a low level mark or indicating that no more liquid manure is entering or exiting the pump.

17. The method according to claim 11, further comprising altering the pre-programmed instructions.

18. The method according to claim 11, further comprising transmitting data between the electronic controller and a remote computer.

19. The method according to claim 11, wherein the electronic controller comprises a programmable logic circuit (PLC).

* * * * *